(12) United States Patent
Lee et al.

(10) Patent No.: US 9,774,796 B2
(45) Date of Patent: Sep. 26, 2017

(54) SURVEILLANCE CAMERA

(71) Applicant: HANWHA TECHWIN CO.,LTD., Changwon-si (KR)

(72) Inventors: Youngchan Lee, Changwon-si (KR); Dongjun Lee, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 184 days.

(21) Appl. No.: 14/645,565

(22) Filed: Mar. 12, 2015

(65) Prior Publication Data
US 2015/0281657 A1   Oct. 1, 2015

(30) Foreign Application Priority Data

Apr. 1, 2014  (KR) .................. 10-2014-0038752

(51) Int. Cl.
*H04N 5/33* (2006.01)
*H04N 5/20* (2006.01)
(Continued)

(52) U.S. Cl.
CPC ............. *H04N 5/33* (2013.01); *H04N 5/2354* (2013.01); *H04N 5/23245* (2013.01)

(58) Field of Classification Search
None
See application file for complete search history.

(56) References Cited

U.S. PATENT DOCUMENTS 5,402,109 A * 3/1995 Mannik ................. G02C 5/001
                                                           340/575
2010/0309315 A1* 12/2010 Hogasten ................ H04N 5/33
                                                           348/164
(Continued)

FOREIGN PATENT DOCUMENTS

JP    2011-211557 A    10/2011
JP    2013-171452 A     9/2013
(Continued)

OTHER PUBLICATIONS

Communication dated Jun. 1, 2015, issued by the Korean Intellectual Property Office in counterpart Korean Application No. 10-2014-0038752.

*Primary Examiner* — Reza Aghevli
(74) *Attorney, Agent, or Firm* — Sughrue Mion, PLLC

(57) ABSTRACT

Provided is a surveillance camera including an optical system, an irradiator; an illuminance sensor, a photoelectric converter, an analog-digital converter, and a main controller. The optical system includes a lens. The irradiator irradiates a wave, different from a visible light ray, in a night mode. The illuminance sensor is installed in a light receiving direction different from a light receiving direction of the optical system. The photoelectric converter is configured to convert light from the optical system into an electrical analog image signal. The analog-digital converter is configured to convert the analog image signal from the photoelectric converter into a digital image signal. The main controller is configured to control the surveillance camera to switch between a day mode and the night mode according to gradation of the digital image signal and illuminance sensed by the illuminance sensor.

20 Claims, 4 Drawing Sheets

(51) Int. Cl.
*H04N 5/232* (2006.01)
*H04N 5/235* (2006.01)

(56) References Cited

U.S. PATENT DOCUMENTS

| | | | |
|---|---|---|---|
| 2012/0038751 A1* | 2/2012 | Yuan | H04N 5/23232 348/51 |
| 2013/0215086 A1* | 8/2013 | Boer | G06F 3/0412 345/175 |
| 2014/0257058 A1* | 9/2014 | Clarysse | G06Q 50/22 600/301 |
| 2015/0085251 A1* | 3/2015 | Larsen | G06K 9/00604 351/206 |
| 2015/0332655 A1* | 11/2015 | Krus | G09G 5/10 345/175 |

FOREIGN PATENT DOCUMENTS

| | | |
|---|---|---|
| KR | 10-2004-0098759 A | 11/2004 |
| KR | 10-2006-0135131 A | 12/2006 |
| KR | 10-2008-0022840 A | 3/2008 |
| KR | 10-2011-0055233 A | 5/2011 |

* cited by examiner

SURVEILLANCE CAMERA

CROSS-REFERENCE TO THE RELATED APPLICATION

This application claims priority from Korean Patent Application No. 10-2014-0038752, filed on Apr. 1, 2014, in the Korean Intellectual Property Office, the disclosure of which is incorporated herein in its entirety by reference.

BACKGROUND

1. Field

Apparatuses and methods consistent with exemplary embodiments relate to surveillance cameras and systems.

2. Description of the Related Art

Surveillance cameras basically operate in two different modes: a day mode and a night mode.

Most surveillance cameras irradiate infrared rays to a photographing target region in the night mode. Also, a switching-type infrared blocking filter is installed in an optical system of the surveillance camera.

In the day mode, infrared rays are not irradiated as the infrared blocking filter is used, and thus, color image data is output.

In the night mode, infrared rays are irradiated as the infrared blocking filter is not used, and thus, black-and-white image data is output.

In the surveillance camera according to the related art, the illuminance of visible rays in a photographing target region is sensed by an illuminance sensor to which the infrared blocking filter is fixedly attached.

When the illuminance sensed by the illuminance sensor is lower than a fixed reference illuminance, the surveillance camera operates in the night mode, and when the illuminance sensed by the illuminance sensor is not lower than the fixed reference illuminance, the surveillance camera operates in the day mode.

The surveillance camera according to the related art has the following problems.

The wavelength of visible rays is about 380 nm to about 770 nm, and the wavelength of infrared rays is about 780 nm or more. Accordingly, the infrared blocking filter attached fixedly to the illuminance sensor of the surveillance camera may not completely block the infrared rays to be irradiated in the night mode.

Thus, when an object approaches the surveillance camera in the night mode, a large amount of infrared rays may be reflected from the object to be incident on the illuminance sensor. In this case, the surveillance camera may be switched to the day mode even at night.

Thus, there may occur a haunting phenomenon in which the surveillance camera is again switched to the night mode when the irradiation of infrared rays is stopped in a state where the surveillance camera is switched to the day mode at night, and then the surveillance camera is again switched to the day mode when the irradiation of infrared rays is started in a state where the surveillance camera is switched to the night mode. The haunting phenomenon may be more severe when the object includes a glass material or a mesh shape.

Due to the haunting phenomenon in which mode switching is repeated at night, a phenomenon in which a surveillance screen is brightened and then darkened may be repeated. Accordingly, when an object having a high infrared reflectance approaches the surveillance camera at night, a surveillant watching the surveillance screen may not quickly detect the object.

SUMMARY

Exemplary embodiments of the inventive concept include a surveillance camera that allows a surveillant watching a surveillance screen to quickly detect an object even when the object having a high infrared reflectance approaches the surveillance camera at night.

Various aspects of the inventive concept will be set forth in part in the description which follows and, in part, will be apparent from the description, or may be learned by practice of the presented exemplary embodiments.

According to an exemplary embodiment, there is provided a surveillance camera which may include: an optical system comprising a lens; an irradiator configured to irradiate a wave, different from a visible light ray, in a night mode; an illuminance sensor installed in a light receiving direction different from a light receiving direction of the optical system; a photoelectric converter configured to convert light from the optical system into an electrical analog image signal; an analog-digital converter configured to convert the analog image signal from the photoelectric converter into a digital image signal; and a main controller configured to control the surveillance camera to switch between a day mode and the night mode according to gradation of the digital image signal and illuminance sensed by the illuminance sensor.

The main controller may switch to the night mode in response to first gradation of the digital image signal obtained at a first time point being less than or equal to a reference gradation value and first illuminance sensed by the illuminance sensor at the first time point being less than or equal to a reference illuminance value.

The main controller may switch to or maintain the day mode in response to the first gradation being greater than the reference gradation value and the first illuminance being greater than the reference illuminance value.

In the night mode, the main controller may set a first gradation threshold value on the basis of a second gradation of the digital image signal obtained at a second time point and set a first illuminance threshold value on the basis of a second illuminance sensed by the illuminance sensor at the second time point. At this time, the main controller may determine whether to switch back to the day mode by comparing third gradation of the digital image obtained at a third time point with the first gradation threshold value and comparing third illuminance sensed by the illumination sensor at the third time point with the first illuminance threshold value.

The main controller may determine whether the third gradation is greater than or equal to the first gradation threshold value and whether third illuminance is greater than or equal to the first illuminance threshold value, and may set a second gradation threshold value on the basis of fourth gradation of the digital image obtained at a fourth time point, and set a second illuminance threshold value on the basis of fourth illuminance sensed by the illumination sensor at the fourth time point in response to determining that the third gradation is greater than or equal to the first gradation threshold value and the third illuminance is greater than or equal to the first illuminance threshold value.

The main controller may determine whether fifth gradation of the digital image obtained at a fifth time point is greater than or equal to the second gradation threshold value and whether fifth illuminance sensed by the illumination sensor at the fifth time point is greater than or equal to the second illuminance threshold value, and may switch to or maintain the day mode in response to determining that the fifth gradation is greater than or equal to the second gradation threshold value and the fifth illuminance is greater than or equal to the second illuminance threshold value.

The first gradation threshold value may be proportional to the second gradation, and the first illuminance threshold value may be proportional to the second illuminance. The second gradation threshold value may be proportional to the fourth gradation, and the second illuminance threshold value may be proportional to the fourth illuminance.

The second time point may be identical to or different from the first time point.

The third time point and the fourth time point may be identical to or different from each other.

Here, the gradation of the digital image may be an average gradation value of the digital image signal obtained in real time, and the illuminance sensed by the illuminance sensor may be an illuminance value sensed by the illuminance sensor in real time.

According to another exemplary embodiment, there is provided a method of driving a surveillance camera including an optical system. The method may include: receiving light, by the optical system; sensing illuminance, by an illuminance sensor installed in a light receiving direction different from a light receiving direction of the optical system; converting the received light into an electrical analog signal; converting the analog image signal into a digital image signal; and switching between a day mode and a night mode according to gradation of the digital image signal and illuminance sensed by the illuminance sensor.

The switching between the day mode and the night mode may include switching to the night mode in response to first gradation of the digital image signal obtained at a first time point being less than or equal to a reference gradation value and first illuminance sensed by the illuminance sensor at the first time point being less than or equal to a reference illuminance value.

The switching between the day mode and the night mode may further include switching to the day mode in response to the first gradation being greater than the reference gradation value and the first illuminance being greater than the reference illuminance value.

The method may further include: setting a first gradation threshold value on the basis of a second gradation of the digital image signal obtained at a second time point and set a first illuminance threshold value on the basis of a second illuminance sensed by the illuminance sensor at the second time point; and determining whether to switch back to the day mode by comparing third gradation of the digital image obtained at a third time point with the first gradation threshold value and comparing third illuminance sensed by the illumination sensor at the third time point with the first illuminance threshold value.

The method may further include: determining whether the third gradation is greater than or equal to the first gradation threshold value and whether third illuminance is greater than or equal to the first illuminance threshold value; and setting a second gradation threshold value on the basis of fourth gradation of the digital image obtained at a fourth time point, and setting a second illuminance threshold value on the basis of fourth illuminance sensed by the illumination sensor at the fourth time point in response to determining that the third gradation is greater than or equal to the first gradation threshold value and the third illuminance is greater than or equal to the first illuminance threshold value.

The method may further include: determining whether fifth gradation of the digital image obtained at a fifth time point is greater than or equal to the second gradation threshold value and whether fifth illuminance sensed by the illumination sensor at the fifth time point is greater than or equal to the second illuminance threshold value; and switching to the day mode in response to determining that the fifth gradation is greater than or equal to the second gradation threshold value and the fifth illuminance is greater than or equal to the second illuminance threshold value.

The first gradation threshold value may be proportional to the second gradation, and the first illuminance threshold value may be proportional to the second illuminance.

The second gradation threshold value may be proportional to the fourth gradation, and the second illuminance threshold value may be proportional to the fourth illuminance.

The second time point may be identical to or different from the first time point.

The third time point and the fourth time point may be identical to or different from each other.

BRIEF DESCRIPTION OF THE DRAWINGS

These and/or other aspects will become apparent and more readily appreciated from the following description of exemplary embodiments, taken in conjunction with the accompanying drawings, in which.

DETAILED DESCRIPTION

Figure 1:
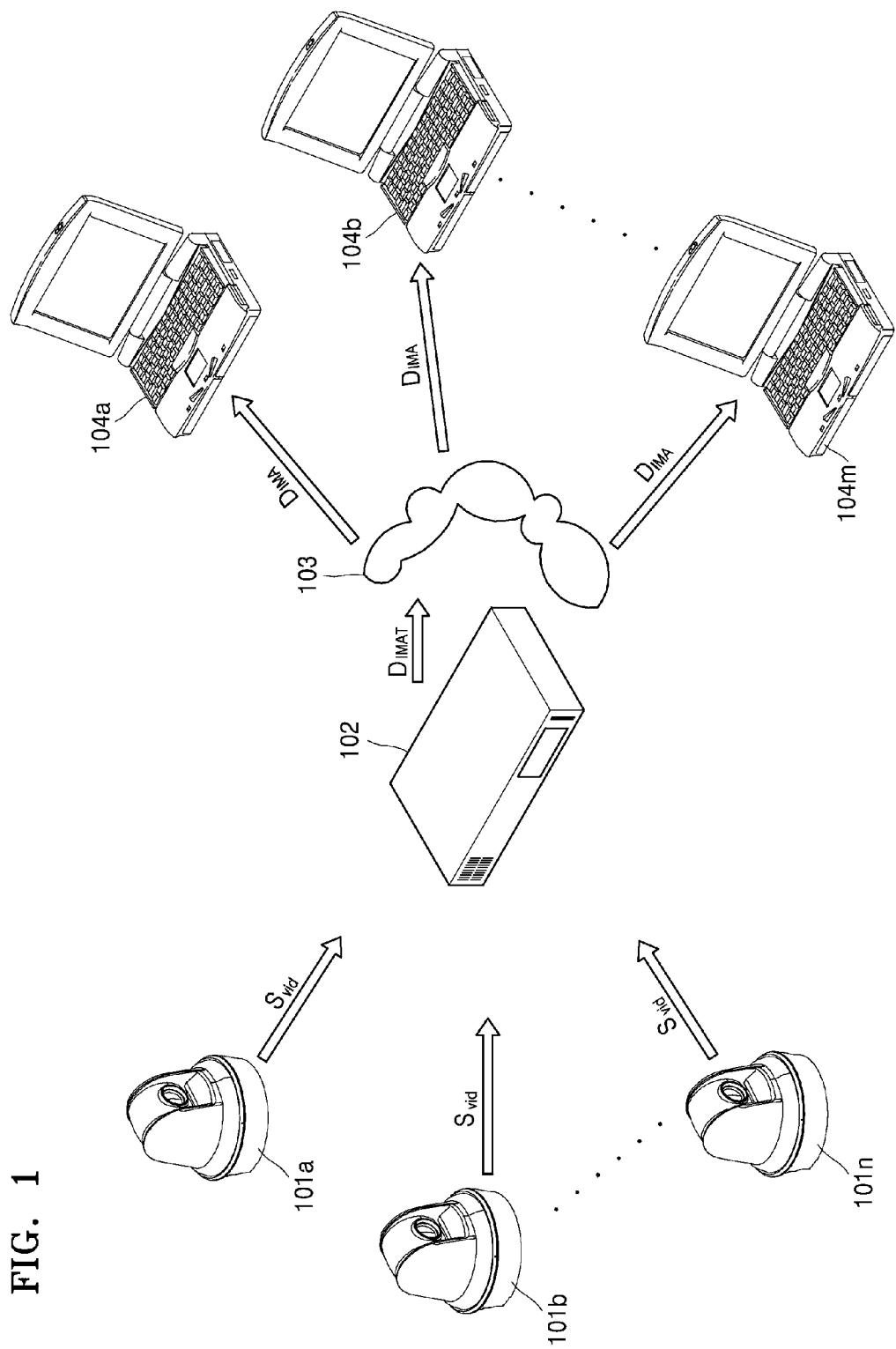
FIG. 1 is a diagram illustrating a surveillance system including surveillance cameras, according to an exemplary embodiment.

Reference will now be made in detail to exemplary embodiments which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the drawings, to explain aspects of the present description. As used herein, expressions such as "at least one of," when preceding a list of elements, modify the entire list of elements and do not modify the individual elements of the list.

The following descriptions and the accompanying drawings are for understanding operations according to the inventive concept, and descriptions of well-known features, which may be easily implemented by those of ordinary skill in the art, will be omitted for conciseness.

Also, the specification and the drawings are not intended to limit the scope of the inventive concept, and the scope of the inventive concept is to be defined by the appended claims. For the best understanding of the inventive concept, the terms used herein are to be interpreted as having meanings and concepts that are consistent with the inventive concept.

Hereinafter, exemplary embodiments will be described in detail with reference to the accompanying drawings. Also, in the specification and the drawings, like reference numerals denote like elements, and redundant descriptions thereof will be omitted.

FIG. 1 illustrates a surveillance system including surveillance cameras 101a to 101n, according to an exemplary embodiment.

Referring to FIG. 1, the surveillance cameras 101a to 101n according to the present exemplary embodiment transmit analog video signals Svid to a digital video recorder 102.

The digital video recorder 102 converts the analog video signals Svid from the surveillance cameras 101a into 101n into digital video data $D_{IMAT}$, stores the digital video data $D_{IMAT}$, and transmits the digital video data $D_{IMAT}$ to the target devices 104a to 104m through a communication network 103. For example, in the surveillance system, the communication network 103 is the Internet, and the target devices 104a to 104m are client terminals. In FIG. 1, $D_{IMAT}$ denotes the digital video data transmitted from the digital video recorder 102 to the communication network 103, and $D_{IMA}$ denotes digital video data transmitted from the communication network 103 to the client terminals 104a to 104m.

Hereinafter, the surveillance cameras 101a to 101n according to the present exemplary embodiment will be described with reference to FIGS. 2 and 4.

Figure 2:
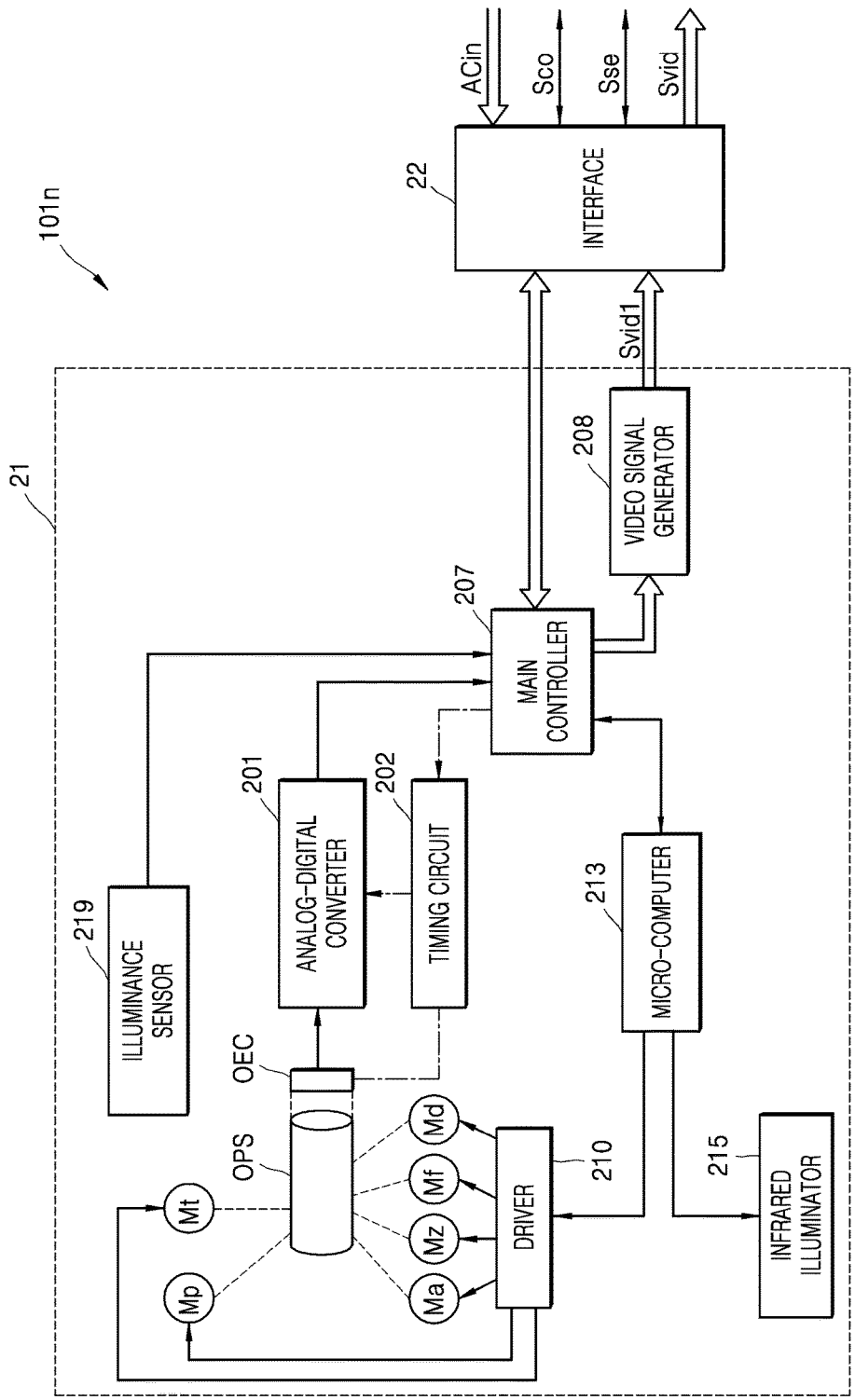
FIG. 2 is a diagram illustrating an internal configuration of the surveillance camera of FIG. 1, according to an exemplary embodiment.

FIG. 2 illustrates an internal configuration of the surveillance camera 101n of FIG. 1, according to an exemplary embodiment.

Referring to FIG. 2, the surveillance camera 101n according to the present exemplary embodiment includes a body unit 21 and an interface 22. In FIG. 2, ACin denotes alternating current (AC) power, Sco denotes a communication signal with the digital video recorder 102 (see FIG. 1), Sse denotes a communication signal with various sensors, and Svid1 and Svid denote video signals.

The body unit 21 includes an optical system OPS, a photoelectric converter OEC, an analog-digital converter 201, a main controller 207, a video signal generator 208, a driver 210, a micro-computer 213, an iris motor Ma, a zoom motor Mz, a focus motor Mf, a filter motor Md, a panning motor Mp, a tilting motor Mt, an infrared illuminator (or irradiator) 215, and an illuminance (or irradiation) sensor 219.

The optical system OPS includes at least one lens and at least one infrared blocking filter and optically processes light from an object. The at least one lens of the optical system OPS may include a zoom lens and a focus lens.

The photoelectric converter OEC includes a charge coupled device (CCD) or a complementary metal-oxide-semiconductor (CMOS) and converts the light received from the optical system OPS into an electrical analog signal. Herein, the main controller 207 controls a timing circuit 202 to control operations of the photoelectric converter OEC and the analog-digital converter 201.

The analog-digital converter 201 converts an analog image signal from the photoelectric converter OEC into a digital image signal. In detail, the analog-digital converter 201 removes a high frequency noise in the analog image signal from the photoelectric converter OEC, modulates an amplitude thereof, and then converts the same into digital video data. The digital image data is input to the main controller 207.

The main controller 207, for example, a digital signal processor controls operations of the photoelectric converter OEC and the analog-digital converter 201, and converts the mode of the digital image signal from the analog-digital converter 201. In detail, the main controller 207 processes a digital signal from the analog-digital converter 201 to generate a digital image signal that is classified into a luminance signal and a chrominance signal.

The video signal generator 208 converts the digital image signal from the main controller 207 into a video signal Svid1 that is an analog image signal.

The main controller 207 transmits the video signal Svid1 from the video signal generator 208 to the digital video recorder 102 (see FIG. 1) through the interface 22.

The micro-computer 213 controls the driver 210 to drive the iris motor Ma, the zoom motor Mz, the focus motor Mf, the filter motor Md, the panning motor Mp, and the tilting motor Mt. Also, the micro-computer 213 controls an operation of the infrared illuminator 215 according to a command signal from the main controller 207.

The iris motor Ma drives an iris, the zoom motor Mz drives a zoom lens, and the focus motor Mf drives a focus lens. The filter motor Md drives the infrared blocking filter.

The panning motor Mp rotates the optical system OPS to the right and left. The tilting motor Mt rotates an assembly of the photoelectric converter OEC and the optical system OPS up and down.

The illuminance sensor 219, to which an infrared blocking filter is fixedly attached, senses the illuminance of light and/or wave generated from a photographing target region. This infrared blocking filter of the illuminance sensor may be different from the infrared blocking filter included in the optical system OPS. The illuminance sensor 219 is installed in a light (or wave) receiving direction different from a light receiving direction of the optical system OPS. Thus, an optical axis of light sensed by the illuminance sensor 219 is different from an optical axis of light received by the optical system OPS.

The main controller 207 performs a control operation for a day mode or a night mode according to gradation of the digital image signal from the analog-digital converter 201 and illuminance sensed by the illuminance sensor 219.

In the day mode, infrared rays are not irradiated from the infrared illuminator 215 as the infrared blocking filter is used in the optical system OPS, and thus, color image data is output.

In the night mode, infrared rays are irradiated from the infrared illuminator 215 as the infrared blocking filter is not used in the optical system OPS, and thus, black-and-white image data is output.

Figure 3:
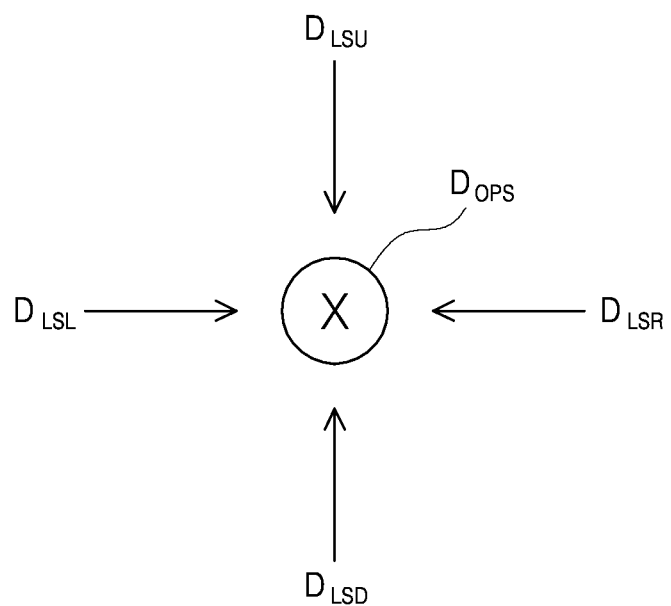
FIG. 3 is a diagram illustrating a light receiving direction of an illuminance sensor with respect to a light receiving direction of an optical system of FIG. 2, according to an exemplary embodiment.

FIG. 3 is a diagram illustrating a light receiving direction of the illuminance sensor 219 with respect to a light receiving direction of the optical system OPS of FIG. 2, according to an exemplary embodiment.

Referring to FIGS. 2 and 3, the illuminance sensor 219 is installed in a light receiving direction different from a light receiving direction $D_{OPS}$ of the optical system OPS. For example, the light receiving direction of the illuminance sensor 219 is any one of a right direction $D_{LSR}$, a left direction $D_{LSL}$, an up direction $D_{LSU}$, and a down direction $D_{LSD}$ with respect to the light receiving direction of the optical system OPS.

Accordingly, a relatively small amount of infrared rays are incident on the illuminance sensor 219 even when a large amount of infrared rays are reflected from an object when the object approaches the surveillance camera 101*n* in the night mode. That is, since the surveillance camera 101*n* is not switched to the day mode even when the object approaches the surveillance camera 101*n* in the night mode, a haunting phenomenon in which mode switching is repeated may be prevented.

Thus, even when the object having a high infrared reflectance approaches the surveillance camera 101*n* at night, since a phenomenon in which a surveillance screen of the client terminals 104*a* to 104*m* (see FIG. 1) is repeatedly brightened and darkened does not occur, a surveillant watching the surveillance screen may quickly detect the object.

Also, since the illuminance sensor 219 is installed in the light receiving direction different from the light receiving direction of the optical system OPS, a facility such as a wall may exist in the light receiving direction of the illuminance sensor 219. In this case, there may be a new problem that the surveillance camera is switched from the day mode to the night mode or is not switched back to the day mode even at the daytime illuminance.

However, the main controller 207 performs a control operation for the day mode or the night mode in consideration of not only the illuminance sensed by the illuminance sensor 219 but also the gradation of the digital image signal from the analog-digital converter 201. Here, the illuminance and gradation may be average illumination and gradation, respectively. Also, the illuminance sensed by the illuminance sensor 219 and the gradation of the digital image signal may be illuminance and average gradation obtained at a current time point. Thus, the new problem may be prevented. The operation of the main controller 207 related to this is illustrated in FIG. 4.

Figure 4:
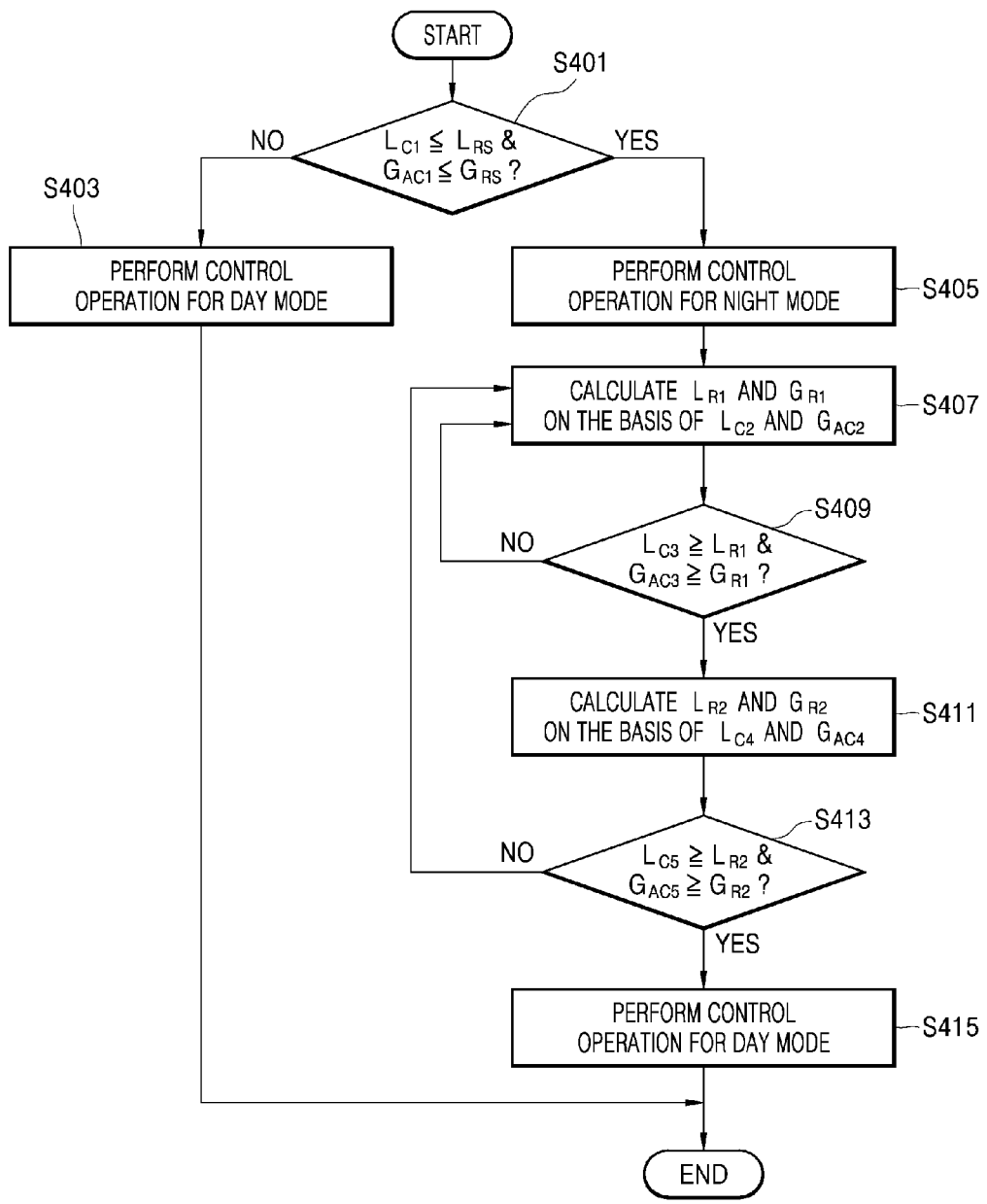
FIG. 4 is a flowchart of a method for performing a control operation for a day mode or a night mode by a main controller of FIG. 2 according to gradation of a digital image signal and illuminance sensed by an illuminance sensor, according to an exemplary embodiment.

FIG. 4 illustrates a method for performing a control operation for the day mode or the night mode by the main controller 207 of FIG. 2 according to the gradation of the digital image signal from the analog-digital converter 201 and the illuminance sensed by the illuminance sensor 219.

In FIG. 4, $L_C$ denotes current illuminance sensed by the illuminance sensor 219, $G_{AC}$ denotes current gradation of the digital image signal, $L_{RS}$ denotes a reference illuminance value, $G_{RS}$ denotes a reference gradation value, $L_{R1}$ denotes a first illuminance threshold value, $G_{R1}$ denotes a first gradation threshold value, $L_{R2}$ denotes a second illuminance threshold value, $G_{R2}$ denotes a second gradation threshold value, $L_{C1}$ denotes first current illuminance, $G_{AC1}$ denotes first current gradation, $L_{C2}$ denotes second current illuminance, $G_{AC2}$ denotes second current gradation, $L_{C3}$ denotes third current illuminance, $G_{AC3}$ denotes third current gradation, $L_{C4}$ denotes fourth current illuminance, $G_{AC4}$ denotes fourth current gradation, $L_{C5}$ denotes fifth current illuminance, and $G_{AC5}$ denotes fifth current gradation.

Also, the reference illuminance value and the reference gradation value are preset values, the first illuminance threshold value and the second illuminance threshold value are set on the basis of the current illuminance, and the first gradation threshold value and the second gradation threshold value are set on the basis of the current gradation of the digital image signal. The first illuminance threshold value and the second illuminance threshold value may be respectively set on the basis of illuminances sensed at different time points, and the first gradation threshold value and the second gradation threshold value may be respectively set on the basis of gradations sensed at different time points.

Referring to FIGS. 2 and 4, when switching to a control operation for the day mode in the process of performing a control operation for the night mode, the main controller 207 switches to a control operation for the day mode when a first switching condition is satisfied as a result of a first comparison operation (operation S409) and then a second switching condition is satisfied as a result of a second comparison operation (operation S411).

By verification through the two-time comparisons, a mode switching error caused by reflected light, which is instantaneously generated very strongly, and a haunting phenomenon caused by the mode switching error may be prevented more effectively.

The operations of the main controller 207 will be described below in detail with reference to FIGS. 2 and 4.

First, the main controller 207 determines whether the current illuminance $L_C$ (hereinafter referred to as first current illuminance $L_{C1}$) sensed by the illuminance sensor 219 is less than or equal to the reference illuminance value $L_{RS}$ and whether the current gradation $G_{AC}$ (hereinafter referred to as the first current gradation $G_{AC1}$) of a digital image signal output from the analog-digital converter 201 is less than or equal to the reference gradation value $G_{RS}$ (operation S401).

When the condition in operation S401 is not satisfied, the main controller 207 performs a control operation for the day mode (operation S403). In the process of performing the control operation for the day mode, operation S401 is periodically performed.

When the condition in operation S401 is satisfied, the main controller 207 performs a control operation for the night mode (operation S405).

After switching to the control operation for the night mode in the process of performing the control operation for the day mode (operation S403), the main controller 207 calculates the first illuminance threshold value $L_{R1}$ by using then current illuminance $L_C$ (hereinafter referred to as the second current illuminance $L_{C2}$) sensed by the illuminance sensor 219 and calculates the first gradation threshold value $G_{R1}$ by using then current gradation $G_{AC}$ (hereinafter referred to as the second current gradation $G_{AC2}$) of a digital image signal output from the analog-digital converter 201 (operation S407). Herein, the second current illuminance $L_{C2}$ and the first current illuminance $L_{C1}$ may be sensed at the same time point or at different time points, and the second current gradation $G_{AC2}$ and the first current gradation $G_{AC1}$ may also be calculated at the same time point or at different time points.

In the present exemplary embodiment, the first illuminance threshold value $L_{R1}$ may be about 1.25 times the second illuminance $L_{C2}$, and the first gradation threshold value $G_{R1}$ may be about 1.25 times the second gradation $G_{AC2}$. That is, the first illuminance threshold value $L_{R1}$ may be set on the basis of the second current illuminance and set to be greater than the first current illuminance, and the first gradation threshold value $G_{R1}$ may be set on the basis of the second current gradation and set to be greater than the first current gradation.

By comparing the calculated first illuminance threshold value $L_{R1}$ and the calculated first gradation threshold value $G_{R1}$ with then current illuminance (hereinafter referred to as the third current illuminance $L_{C3}$) and then current gradation (hereinafter referred to as the third current gradation $G_{AC3}$) respectively, the main controller 207 determines whether the third current illuminance $L_{C3}$ is greater than or equal to the first illuminance threshold value $L_{R1}$ and whether the third current gradation $G_{AC3}$ is greater than or equal to the first gradation threshold value $G_{R1}$ (operation S409).

When the third current illuminance $L_{C3}$ is greater than or equal to the first illuminance threshold value $L_{R1}$ and the third current gradation $G_{AC3}$ is greater than or equal to the first gradation threshold value $G_{R1}$ as a result of the comparison, the main controller 207 proceeds to an operation (S411) of setting the second illuminance threshold value $L_{R2}$ and the second gradation threshold value $G_{R2}$.

Herein, the third current illuminance $L_{C3}$ compared with the first illuminance threshold value $L_{R1}$ may be sensed at a different time point from the second current illuminance $L_{C2}$ used to calculate the first illuminance threshold value $L_{R1}$, and the third current gradation $G_{AC3}$ compared with the first gradation threshold value $G_{R1}$ may be calculated at a different time point from the second current gradation $G_{AC2}$ used to calculate the first gradation threshold value $G_{R1}$.

In this case, the second illuminance threshold value $L_{R2}$ may be calculated on the basis of then current illuminance $L_C$ (hereinafter referred to as the fourth current illuminance $L_{C4}$), and the second gradation threshold value $G_{R2}$ may be calculated on the basis of then current gradation (hereinafter referred to as the fourth current gradation $G_{AC4}$). In detail, the second illuminance threshold value $L_{R2}$ may be about 1.875 times the fourth current illuminance $L_{C4}$, and the second gradation threshold value $G_{R2}$ may be about 1.875 times the fourth current gradation $G_{AC4}$.

The second illuminance threshold value $L_{R2}$ may be calculated on the basis of the third current illuminance $L_{C3}$. However, the inventive concept is not limited thereto, and the second illuminance threshold value $L_{R2}$ may be calculated on the basis of then current illuminance that is currently sensed. Also, the second gradation threshold value $G_{R2}$ may be calculated on the basis of the third current gradation $G_{AC3}$. However, the inventive concept is not limited thereto, and the second gradation threshold value $G_{R2}$ may be calculated on the basis of then current gradation.

Thereafter, by comparing the calculated second illuminance threshold value $L_{R2}$ and the calculated second gradation threshold value $G_{R2}$ with then current illuminance $L_C$ (hereinafter referred to as the fifth current illuminance $L_{C5}$) and then current gradation $G_{AC}$ (hereinafter referred to as the fifth current gradation $G_{AC5}$) respectively, the main controller 207 determines whether the fifth current illuminance $L_{C5}$ is greater than or equal to the second illuminance threshold value $L_{R2}$ and whether the fifth current gradation $G_{AC5}$ is greater than or equal to the second gradation threshold value $G_{R2}$ (operation S413). When the fifth current illuminance $L_{C5}$ is greater than or equal to the second illuminance threshold value $L_{R2}$ and the fifth current gradation $G_{AC5}$ is greater than or equal to the second gradation threshold value $G_{R2}$ as a result of the comparison, the main controller 207 performs a control operation for the day mode.

Herein, the fifth current illuminance $L_{C5}$ compared with the second illuminance threshold value $L_{R2}$ may be sensed at a different time point from the fourth current illuminance $L_{C4}$ used to calculate the second illuminance threshold value $L_{R2}$, and the fifth current gradation $G_{AC5}$ compared with the second gradation threshold value $G_{R2}$ may be calculated at a different time point from the fourth current gradation $G_{AC4}$ used to calculate the second gradation threshold value $G_{R2}$.

When the main controller 207 switches to the night mode, the illuminance threshold values $L_{R1}$ and $L_{R2}$ and the gradation threshold values $G_{R1}$ and $G_{R2}$ are adaptively calculated by using the current illuminance $L_C$ that is sensed in real time and the current gradation $G_{AC}$ that is calculated in real time. Accordingly, since the illuminance threshold values $L_{R1}$ and $L_{R2}$ and the gradation threshold values $G_{R1}$ and $G_{R2}$, which will be used to switch from the night mode to the day mode, reflect the illuminance environment that changes gradually in the photographing target region, a haunting phenomenon caused by a mode switching error may be prevented more effectively.

In the process of performing the control operation for the night mode, the main controller 207 periodically performs operations S409, S411, and S413.

When the third current illuminance $L_{C3}$ sensed by the illuminance sensor 219 is greater than or equal to the first illuminance threshold value $L_{R1}$ and the third current gradation $G_{AC3}$ of the digital image signal from the analog-digital converter 201 is greater than or equal to the first gradation threshold value $G_{R1}$ in the first comparison operation (operation S409), the second comparison operation (operation S413) is performed.

When the fifth current illuminance $L_{C5}$ sensed by the illuminance sensor 219 is greater than the second illuminance threshold value $L_{R2}$ and the fifth current gradation $G_{AC5}$ of the digital image signal from the analog-digital converter 201 is greater than the second gradation threshold value $G_{R2}$ in the second comparison operation (operation S413), the control operation for the day mode (operation S415) is performed.

Operation S401 is periodically performed, and the operation of the surveillance camera is set to the day mode or the night mode.

In the above exemplary embodiments, each of the first to five current degradations may be average degradation of a digital image signal output from the analog-digital converter 201 in real time.

As described above, according to the exemplary embodiments, in the surveillance camera, the illuminance sensor is installed in the light receiving direction different from the light receiving direction of the optical system. For example, the light receiving direction of the illuminance sensor is any one of the right direction, the left direction, the up direction, and the down direction with respect to the light receiving direction of the optical system.

Accordingly, a relatively small amount of infrared rays are incident on the illuminance sensor even when a large amount of infrared rays are reflected from the object when the object approaches the surveillance camera in the night mode. That is, since the surveillance camera is not switched to the day mode even when the object approaches the surveillance camera in the night mode, the haunting phenomenon in which mode switching is repeated may be prevented.

Thus, even when the object having a high infrared reflectance approaches the surveillance camera in the night, since the phenomenon in which the surveillance screen is repeatedly brightened and darkened does not occur, the surveillant watching the surveillance screen may quickly detect the object.

Also, since the illuminance sensor is installed in the light receiving direction different from the light receiving direction of the optical system, a facility such as a wall may exist in the light receiving direction of the illuminance sensing unit. In this case, there may be a new problem in which the surveillance camera is switched to the night mode or is not switched from the night mode to the day mode in spite of the daytime illuminance.

However, the main controller performs a control operation for the day mode or the night mode in consideration of not only the current illuminance from the illuminance sensor but also the current gradation of the digital image signal. Thus, the new problem may be prevented.

In the above exemplary embodiments, infrared rays are used in the surveillance camera in the night mode. However, the inventive concept may also apply to a camera irradiating different types of wave such as an electromagnetic wave, not being limited thereto, in the night mode.

The inventive concept may also be widely used in general cameras in addition to surveillance cameras.

At least one of the components, elements or units represented by a block as illustrated in FIG. 2 (e.g., the main controller 207) may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The transmission medium can include carrier waves transmitted through the Internet or various types of communication channel. The computer readable recording medium can also be distributed over network coupled computer systems so that the computer readable code is stored and executed in a distributed fashion.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A surveillance camera comprising:
an optical system comprising a lens;
an illuminance sensor installed in a light receiving direction different from a light receiving direction of the optical system;
a photoelectric converter configured to convert light from the optical system into an electrical analog image signal;
an analog-digital converter configured to convert the analog image signal from the photoelectric converter into a digital image signal;
a main controller configured to control the surveillance camera to switch between a day mode and a night mode according to gradation of the digital image signal and illuminance sensed by the illuminance sensor, wherein
the main controller is configured to switch to the night mode in response to first gradation of the digital image signal obtained at a first time point being less than or equal to a reference gradation value and first illuminance sensed by the illuminance sensor at the first time point being less than or equal to a reference illuminance value.

2. The surveillance camera of claim 1, wherein the main controller is configured to switch to the night mode in response to the first illuminance sensed by the illuminance sensor at the first time point being less than or equal to the reference illuminance value, and
wherein the main controller is configured to determine whether to switch back to the day mode by comparing second illuminance sensed by the illumination sensor at a second time point with a first illuminance threshold value.

3. The surveillance camera of claim 1, wherein the gradation of the digital image comprises an average gradation value of the digital image signal obtained in real time, and the illuminance sensed by the illuminance sensor comprises an illuminance value sensed by the illuminance sensor in real time.

4. The surveillance camera of claim 1, wherein the main controller is configured to switch to the day mode in response to the first gradation is greater than the reference gradation value and the first illuminance is greater than the reference illuminance value.

5. The surveillance camera of claim 1, wherein, in the night mode, the main controller is configured to set a first gradation threshold value on the basis of a second gradation of the digital image signal obtained at a second time point and set a first illuminance threshold value on the basis of a second illuminance sensed by the illuminance sensor at the second time point, and
wherein the main controller is configured to determine whether to switch back to the day mode by comparing third gradation of the digital image obtained at a third time point with the first gradation threshold value and comparing third illuminance sensed by the illumination sensor at the third time point with the first illuminance threshold value.

6. The surveillance camera of claim 5, wherein the main controller is further configured to:
determine whether the third gradation is greater than or equal to the first gradation threshold value and whether third illuminance is greater than or equal to the first illuminance threshold value; and
set a second gradation threshold value on the basis of fourth gradation of the digital image obtained at a fourth time point, and set a second illuminance threshold value on the basis of fourth illuminance sensed by the illumination sensor at the fourth time point in response to determining that the third gradation is greater than or equal to the first gradation threshold value and the third illuminance is greater than or equal to the first illuminance threshold value.

7. The surveillance camera of claim 5, wherein the second time point is different from the first time point.

8. The surveillance camera of claim 6, wherein the main controller is configured to:
   determine whether fifth gradation of the digital image obtained at a fifth time point is greater than or equal to the second gradation threshold value and whether fifth illuminance sensed by the illumination sensor at the fifth time point is greater than or equal to the second illuminance threshold value; and
   switch to the day mode in response to determining that the fifth gradation is greater than or equal to the second gradation threshold value and the fifth illuminance is greater than or equal to the second illuminance threshold value.

9. The surveillance camera of claim 6, wherein the third time point and the fourth time point are different from each other.

10. The surveillance camera of claim 8, wherein the first gradation threshold value is proportional to the second gradation, and the first illuminance threshold value is proportional to the second illuminance.

11. The surveillance camera of claim 10, wherein the second gradation threshold value is proportional to the fourth gradation, and the second illuminance threshold value is proportional to the fourth illuminance.

12. A method of driving a surveillance camera comprising an optical system, the method comprising:
   receiving light, by the optical system;
   sensing illuminance, by an illuminance sensor installed in a light receiving direction different from a light receiving direction of the optical system;
   converting the received light into an electrical analog signal;
   converting the analog image signal into a digital image signal; and
   switching between a day mode and a night mode according to gradation of the digital image and illuminance sensed by the illuminance sensor, wherein
   the switching between the day mode and the night mode comprises switching to the night mode in response to first gradation of the digital image signal obtained at a first time point being less than or equal to a reference gradation value and first illuminance sensed by the illuminance sensor at the first time point being less than or equal to a reference illuminance value.

13. The method of claim 12, wherein the switching comprises:
   switching to the night mode in response to the first illuminance sensed by the illuminance sensor at the first time point being less than or equal to the reference illuminance value, and
   determining whether to switch back to the day mode by comparing second illuminance sensed by the illumination sensor at a second time point with a first illuminance threshold value.

14. The method of claim 12, wherein the switching between the day mode and the night mode further comprises switching to the day mode in response to the first gradation being greater than the reference gradation value and the first illuminance being greater than the reference illuminance value.

15. The method of claim 12, further comprising:
   setting a first gradation threshold value on the basis of a second gradation of the digital image signal obtained at a second time point and set a first illuminance threshold value on the basis of a second illuminance sensed by the illuminance sensor at the second time point; and
   determining whether to switch back to the day mode by comparing third gradation of the digital image obtained at a third time point with the first gradation threshold value and comparing third illuminance sensed by the illumination sensor at the third time point with the first illuminance threshold value.

16. The method of claim 15, further comprising:
   determining whether the third gradation is greater than or equal to the first gradation threshold value and whether third illuminance is greater than or equal to the first illuminance threshold value; and
   setting a second gradation threshold value on the basis of fourth gradation of the digital image obtained at a fourth time point, and setting a second illuminance threshold value on the basis of fourth illuminance sensed by the illumination sensor at the fourth time point in response to determining that the third gradation is greater than or equal to the first gradation threshold value and the third illuminance is greater than or equal to the first illuminance threshold value.

17. The method of claim 15, wherein the second time point is different from the first time point.

18. The method of claim 16, further comprising:
   determining whether fifth gradation of the digital image obtained at a fifth time point is greater than or equal to the second gradation threshold value and whether fifth illuminance sensed by the illumination sensor at the fifth time point is greater than or equal to the second illuminance threshold value; and
   switching to the day mode in response to determining that the fifth gradation is greater than or equal to the second gradation threshold value and the fifth illuminance is greater than or equal to the second illuminance threshold value.

19. The method of claim 16, wherein the third time point and the fourth time point are different from each other.

20. The method of claim 18, wherein the first gradation threshold value is proportional to the second gradation, and the first illuminance threshold value is proportional to the second illuminance, and
   wherein the second gradation threshold value is proportional to the fourth gradation, and the second illuminance threshold value is proportional to the fourth illuminance.

* * * * *